United States Patent
Huis In Het Veld

(10) Patent No.: US 8,840,358 B2
(45) Date of Patent: Sep. 23, 2014

(54) METHOD OF CONTROLLING A COMPRESSOR AND APPARATUS THEREFOR

(75) Inventor: Wilhelmus Hermanus Huis In Het Veld, Amsterdam (NL)

(73) Assignee: Shell Oil Company, Houston, TX (US)

( * ) Notice: Subject to any disclaimer, the term of this patent is extended or adjusted under 35 U.S.C. 154(b) by 650 days.

(21) Appl. No.: 13/122,944

(22) PCT Filed: Oct. 6, 2009

(86) PCT No.: PCT/EP2009/062953
§ 371 (c)(1),
(2), (4) Date: Apr. 6, 2011

(87) PCT Pub. No.: WO2010/040734
PCT Pub. Date: Apr. 15, 2010

(65) Prior Publication Data
US 2012/0121376 A1 May 17, 2012

(30) Foreign Application Priority Data
Oct. 7, 2008 (EP) .................................. 08166028

(51) Int. Cl.
*F04D 27/02* (2006.01)

(52) U.S. Cl.
CPC ........ *F04D 27/0284* (2013.01); *F04D 27/0261* (2013.01); *F04D 27/0207* (2013.01)
USPC ............................................... 415/1; 415/37

(58) Field of Classification Search
USPC ............................. 415/127, 28, 36, 37, 43–45
See application file for complete search history.

(56) References Cited

U.S. PATENT DOCUMENTS

| | | | | |
|---|---|---|---|---|
| 4,156,578 A | * | 5/1979 | Agar et al. | ......................... 415/1 |
| 4,464,720 A | | 8/1984 | Agarwal | .................. 364/431.05 |

(Continued)

FOREIGN PATENT DOCUMENTS

| | | | |
|---|---|---|---|
| EP | 1069314 | 1/2001 | .............. F04D 27/02 |
| GB | 2002451 | 2/1979 | .............. F04D 27/02 |

*Primary Examiner* — Ned Landrum
*Assistant Examiner* — Woody A Lee, Jr.

(57) ABSTRACT

The present invention relates to a method of controlling a compressor and an apparatus therefor, the method, comprising at least the steps of: (a) providing a compressor feed stream (10); (b) passing the compressor feed stream (10) to an inlet (48) of the compressor (50) to provide a compressed stream (60) at an outlet (52) of the compressor (50); (c) calculating one or more controlled variables (CO1, CO2) that are invariant to compressor inlet conditions of the compressor feed stream (10), said inlet conditions comprising at least the ratio of specific heats (Cp/Cv) of the compressor feed stream (10), said one or more controlled variables comprising a surge controlled variable (CO1) representing the surge characteristics of the compressor (50); (d) providing one or more set points (SP1, SP2), that are invariant to the compressor inlet conditions of the compressor feed stream (10), said inlet conditions comprising at least the ratio of specific heats (Cp/Cv) of the compressor feed stream (10), said one or more set points comprising an anti-surge set point (SP1); and (e) providing a compressor recycle line (30) around the compressor (50) from the compressed stream (60) to upstream of the inlet (48) of the compressor (50), said compressor recycle line (30) comprising a in-line recycle valve (34); and controlling at least one of the in-line recycle valve (34) and the speed of the compressor (50) in response to the difference between the surge controlled variable (CO1) calculated in step (c) and the anti-surge (SP1) provided in step (d).

19 Claims, 4 Drawing Sheets

(56) References Cited

U.S. PATENT DOCUMENTS

| | | | |
|---|---|---|---|
| 4,831,535 A * | 5/1989 | Blotenberg | 701/100 |
| 4,971,516 A | 11/1990 | Lawless et al. | |
| 7,736,126 B2 * | 6/2010 | Joco et al. | 415/144 |

* cited by examiner

METHOD OF CONTROLLING A COMPRESSOR AND APPARATUS THEREFOR

The present application claims priority from European Patent Application 08/166028.4 filed 7 Oct. 2008.

FIELD OF THE INVENTION

The present invention relates to a method of controlling a compressor, and an apparatus therefor, particularly as part of the refining of crude oil and the treatment of natural gas.

BACKGROUND OF THE INVENTION

Compressors, such as axial and centrifugal compressors, are used in the treatment of many gaseous streams, such as the treatment of natural gas already discussed, and in the refining of crude oil, in many systems and arrangements.

Usually there is a vapour recycle or recirculation line around the compressor to avoid 'surge'. Normally, the phenomenon of surge occurs in compressors at low volumetric flow rates, and hence limits the minimum capacity of a given compressor. In the operation of a compressor, as the system resistance is increased, the ratio of absolute pressures (the absolute pressure at the outlet of the compressor divided by the absolute pressure at the inlet of the compressor) generated by the compressor increases to overcome this resistance. As the system pressure increases, less flow can pass through the compressor, and this will continue up to the maximum pressure ratio of the compressor. The limit in the minimum flow to the compressor for a particular compressor speed is known as the surge point. Determining the surge points for different compressor speeds provides a surge line.

Below the surge line the outlet pressure exceeds that which the compressor is capable of delivering, causing a momentary backflow condition. During backflow the system resistance decreases, causing the back pressure to drop, enabling the compressor to deliver increased flow. If the opposition to flow downstream of the compressor is unchanged, peak pressure ratio delivery will again be approached and backflow observed, producing the cyclic condition known as surge. The operation of a compressor beyond the surge point can produce considerable mechanical damage due to vibration, noise, axial shaft movement and overheating.

U.S. Pat. No. 4,971,516 discloses a method and apparatus for operating compressors to avoid surges. The compressor is controlled by determining a controlled variable from (i) direct measurement of the rate of volumetric flow, Q, of gas through the compressor with an acoustic flow meter in combination with a standard flow meter and (ii) measurement of the speed, N, of the compressor. The controlled variable is the Q/N ratio. The measured Q/N ratio is used to operate a recycle valve in a bypass line when it nears a variable set point determined from the sonic velocity, $v_{sd}$, below which surge can occur. U.S. Pat. No. 4,971,516 also suggests that the set point can also be determined from the compressor speed N.

One problem associated with this operating method is that the set point determined as function of the sonic velocity or compressor speed is not invariant for changes of compressor inlet conditions like e.g. ratio of specific heats. Changes to a specific heat ratio occur when the composition of the compressed gas changes or when completely different gasses are to be compressed. The latter situation may occur when the operational mode of a compressor changes, for instance in a liquefaction plant where the refrigerant gas to be compressed in normal operation may be propane, while maintenance may be carried out using nitrogen.

U.S. Pat. No. 4,971,516 attempts to solve this problem by using a variable set point which is either a function of compressor speed N or the speed of sound, $v_{sd}$, in the compressor stream. However, both N and $v_{sd}$ vary with compressor conditions i.e. these parameters are not invariant to compressor inlet conditions. Consequently, a set point calculated in this manner may exhibit an error when the pressure at the compressor inlet, density at the compressor inlet and/or the ratio of specific heats at the compressor inlets deviates from those used in the design of the set point function. As a result, set point correction based of functions of either the compressor speed N or the speed of sound $v_{sd}$ are not invariant for all compressor operating conditions.

SUMMARY OF THE INVENTION

The present invention addresses these problems by providing a new family of set points which are invariant to the compressor inlet conditions, such as the ratio of specific heats of the gasses to be compressed.

The present invention also provides a new class of controlled variables of the compressor feed stream, which is invariant to the compressor inlet conditions, such as the ratio of specific heats of the gasses to be compressed.

In a first aspect, the present invention provides a method of controlling a compressor, comprising at least the steps of:
(a) providing a compressor feed stream;
(b) passing the compressor feed stream to an inlet of the compressor to provide a compressed stream at an outlet of the compressor;
(c) calculating one or more controlled variables that are invariant to compressor inlet conditions of the compressor feed stream, said inlet conditions comprising at least the ratio of specific heats of the compressor feed stream, said one or more controlled variables comprising a surge controlled variable representing the surge characteristics of the compressor;
(d) providing one or more set points, that are invariant to the compressor inlet conditions of the compressor feed stream, said inlet conditions comprising at least the ratio of specific heats of the compressor feed stream, said one or more set points comprising an anti-surge set point;
(e) providing a compressor recycle line around the compressor from the compressed stream to upstream of the inlet of the compressor, said compressor recycle line comprising a in-line recycle valve;
(f) controlling at least one of the in-line recycle valve (34) and the speed of the compressor (50) in response to the difference between the surge controlled variable (CO1) calculated in step (c) and the anti-surge set point (SP1) provided in step (d).

In a second aspect, the present invention provides a apparatus for controlling at least one compressor, the apparatus at least comprising:
a compressor to compress a compressor feed stream between an inlet and an outlet to provide a compressed stream, the compressor driven by a driver;
one or more measurers able to measure the sets of parameters comprising: (i) the stream velocity of the compressor feed stream and the sonic velocity of the compressor feed stream or (ii) the volumetric flow of the compressor feed stream through the compressor and the speed of the compressor;
a compressor recycle line around the compressor from the compressed stream to the compressor feed stream, said compressor recycle line comprising an in-line recycle valve;

a controller associated with the one or more measurers for regulating at least one of the in-line recycle valve and the speed of the compressor, wherein the controller:

calculates one or more controlled variables that are invariant to compressor inlet conditions of the compressor feed stream, said inlet conditions comprising at least the ratio of specific heats of the compressor feed stream, said one or more controlled variables comprising a surge controlled variable and determined from the sets of parameters measured by the one or more measurers;

stores one or more set points comprising an anti-surge set point, said set points being invariant to the compressor inlet conditions of the compressor feed stream, said inlet conditions comprising at least the ratio of specific heats of the compressor feed stream; and determines the difference between the surge controlled variable and the anti-surge set point to provide a signal to the in-line recycle valve or driver when the surge controlled variable moves away from the anti-surge set point in the direction of surge.

BRIEF DESCRIPTION OF THE DRAWINGS

Embodiments and examples of the present invention will now be described by way of example only with reference to the accompanying non-limiting drawings in which.

For the purposes of this description, a single reference number will be assigned to a line as well as a stream carried in that line, and a single reference will be assigned to a pressure/velocity of a stream as well as to a measurer of that pressure/velocity.

As discussed above, the phenomenon of surge can produce considerable mechanical damage to the compressor. Other than surge, some compressors may also be damaged by 'stonewall' or 'choking'. The choking of a compressor occurs when there is overcapacity of flow at too low a pressure ratio, so that the compressor 'chokes' and is unable to compress the flow of gas. This causes high vibration which may damage the compressor.

A further object of the method and apparatus disclosed herein is to prevent choking from occurring. The problem of choking can be avoided by controlling a discharge valve, which is preferably a throttling valve, downstream of the compressor recycle line and a bypass line to allow at least a fraction of the compressor feed stream to bypass the compressor and the discharge valve when the operation of the compressor approaches the choke point. The discharge valve is controlled to let down the pressure of the compressed stream and regulate the pressure of the compressed stream relative to the pressure of the bypass line.

BRIEF DESCRIPTION OF THE INVENTION

The choke and surge lines of a compressor are known to the user of the compressor, and are usually properties of a compressor which are part of the compressor design parameters. The characteristic performance curves of a compressor, based on the comparisons of the pressure ratio against mass flow at different gas conditions (e.g. temperature and molecular weight), are parameters provided by the compressor manufacturer to the user, which provide the user with identification of the compressor's choke and surge lines. If such lines are not provided by the manufacturer, they can be determined by an experimental analysis of the particular compressor.

These manufacturer compressor performance curves may be provided as the performance of the compressor at different compressor speeds. Each performance curve for a particular compressor speed is bounded by a surge point at the left and a choke point at the right. By plotting the surge points for different compressor speeds the surge line for the compressor can be obtained. Similarly, by plotting the choke points for a compressor at different compressor speeds, the choke line can be obtained.

The compressor performance curves can be converted to equivalent performance data. As a result of the fully invariant properties of Mach number or Mach squared number, the selection of compressor reference conditions is not critical. However it is preferred to use normal compressor inlet operating conditions which will be closer to equivalent numerical data.

Figure 1:
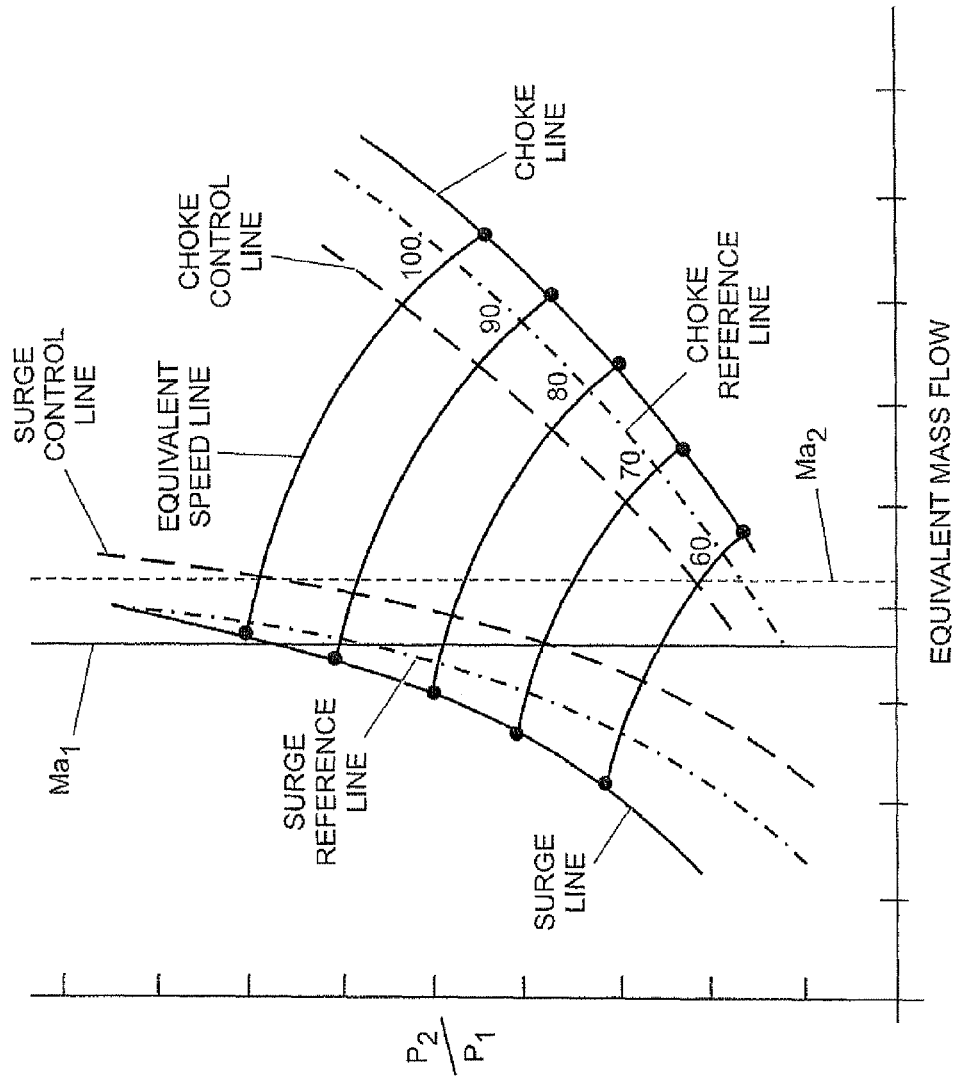
FIG. 1 is an exemplary plot of pressure ratio versus equivalent mass flow for a compressor.

An exemplary equivalent performance plot is shown in FIG. 1, with the pressure ratio defined as the absolute pressure at the compressor outlet, $P_2$, divided by the absolute pressure at the compressor inlet, $P_1$, plotted on the vertical axis and equivalent mass flow plotted on the horizontal axis. The equivalent performance plot is made up of individual equivalent performance curves for different compressor speeds. FIG. 1 shows equivalent performance curves are shown for compressor speeds from 60 to 100%.

Each equivalent performance curve has a low mass flow limit representing the surge point and a high mass flow limit representing the choke point. By joining the surge points for various compressor speeds a surge line is obtained. This represents the minimum equivalent mass flow at which surge can occur for a given equivalent compressor speed.

Similarly when choke is important for a compressor under study, by joining the choke points for various compressor speeds a choke line is obtained.

Instead of using equivalent ratio of absolute pressures versus equivalent mass flow rate, also polytropic head versus actual suction volume flowrate can be used to produce the equivalent performance diagram. Thus, as used herein, references to "equivalent performance plots" and "equivalent performance diagrams" etc. include both these alternative constructions.

An objective of an anti-surge control system is the availability of a measurement indicating the location of the compressor operating point relative to the surge limit. This objective may be satisfied by the so-called surge parameter: a process variable or combination of variables, which, when its value is constant, represents a curve in the compressor performance plot, that runs in parallel with a surge reference line. The surge reference line can be considered to be a model of actual surge points as given by the compressor manufacturer and translated to equivalent conditions. This model however is never perfect which means that some surge points could appear to the left of surge reference line (at lower equivalent flows), leading to some loss of compressor turn-down without recycle operation, as shown in FIG. 1. No surge points should be to the right of surge reference line (so at higher equivalent mass flows) as that would lead to surge protection failure. Corresponding surge parameter value of surge reference line is called surge reference value. In principle, an infinite number of lines for constant surge parameter values (different from surge reference value) can be drawn which run in parallel with the surge reference line.

In FIG. 1, the first line drawn to the right of the surge reference line is the surge control line in which the surge parameter is equal to a constant controller set point. In the event that operation moves to the left of this line, the anti-surge controller will manipulate its output signal to ensure that the compressor operating point moves back to the right of the surge control line or stays on the surge control line. Commonly, the output signal from the anti-surge controller will cause the recycle valve to open, or open further.

An objective of an anti-choke control system is the availability of a measurement indicating the location of the compressor operating point relative to the choke limit. This objective may be satisfied by the so-called choke parameter: a process variable or combination of variables, which, when its value is constant, represents a curve in the compressor performance plot, that runs in parallel with a choke reference line. The choke reference line can be considered to be a model of actual choke points as given by the compressor manufacturer and translated to equivalent conditions. This model however is never perfect which means that some choke points could appear to the right of choke reference line (at higher equivalent flows), as shown in FIG. 1. No choke points should be to the left of choke reference line as that would lead to choke protection failure at lower equivalent mass flows. The corresponding choke parameter value of the choke reference line is called the choke reference value. In principle, an infinite number of lines for constant choke parameter values (different from the choke reference value) can be drawn which run in parallel with the choke reference line.

In FIG. 1, the first line drawn to the left of the choke reference line is the choke control line in which the choke parameter is equal to a constant controller set point. In the event that operation moves to the right of this line, the anti-choke controller will manipulate its output signal to ensure that the compressor operating point moves back to the left of the choke control line or stays on the choke control line. Commonly, the output signal from the anti-choke controller will cause a discharge valve, such as a throttling valve, in the compressed stream at the discharge of the compressor to reduce the pressure of this stream thereby enabling a fraction of the compressor feed stream to bypass the compressor in a bypass line and be introduced downstream of the discharge valve.

Conventional surge parameters used to protect compressors from surge can suffer from the limitation that they are not invariant for the ratio of specific heats of the gas. This ratio will change when composition of gas to be compressed changes. So when gas properties change, resulting in e.g. change of specific heat ratio, conventional surge parameter is not accurate indicator of operation relative to surge limit.

For example, a conventional surge parameter $$\frac{\Delta P_1}{P_1}$$

can be defined by the following equation:

$$\frac{\Delta P_1}{P_1} = C'' \cdot \Phi_{m_e}^2 \cdot \frac{\kappa_{1_a}}{\kappa_{1_r}} \cdot \frac{1}{P_{1_r}} \qquad [A]$$

wherein C" is a constant, $\Phi_{m_e}$ represents equivalent mass flow, $\kappa_{1_a}$ represents the performance (actual) ratio of specific heats for the gas composition to be compressed, $\kappa_{1_r}$ represents the ratio of specific heats for the reference gas composition, and $P_{1_r}$ represents the reference suction pressure. The ratio of specific heats, $\kappa$, is the ratio of the specific heat at constant pressure, Cp, to the specific heat at constant volume, Cp i.e. Cp/Cv.

It is apparent this conventional surge parameter depends on the actual ratio of specific heats. Conventional methods assume that the actual ratio of specific heats stays equal to the ratio of specific heats for the reference gas composition. However, significant errors can occur. For instance, if the ratio of specific heats for the reference gas composition equals 1.4, while the actual ratio of specific heats for the gas composition to be compressed equals 1.3, the surge parameter value will be 7% too high, which is an error in the direction of the surge point. Similar errors arising from changes in the ratio of specific heats occur for other surge parameters.

The requirement to incorporate the ratio of specific heats of gasses into surge parameters can be a significant problem for compressors which may be required to compress gasses of a different nature. For instance, a compressor which is designed to operate on propane, which has a ratio of specific heats of close to 1.1, will have large deviations from calculated conventional surge parameters when operated with nitrogen, which has a ratio of specific heat of 1.4.

In a similar manner to surge parameters, choke parameters are used to protect compressors from choking. Choke parameters suffer from similar limitations to surge parameters in that they change when the compressor inlet conditions, such as the ratio of specific heats of the gas composition to be compressed changes.

An objective is to design the surge and choke parameters, and therefore design surge and choke controlled variables, such that their sensitivity to changes in compressor operating conditions is minimised. Thus, in situations where compressor conditions such as gas composition, pressure, temperature and molecular weight change, the surge control line (which can be the anti-surge controller set point) should not move relative to the surge line of particular compressor. It will hereinafter be explained how invariant surge parameters like those shown in FIG. 1 can be obtained, such as by a fitting process in which 1 or 2 constants in the surge parameter formula achieve optimal values.

A controlled variable, being invariant to changes in the conditions at the inlet of the compressor, such as changes in the ratio of specific heats, such as a surge controlled variable may be used to generate a Surge Reference Line which should accurately represent the surge line. It is important that the Surge Reference Line fit as closely as possible the surge points for the equivalent performance curves. All surge points should be on this line or to the left of this line. Any surge points to the right of this line indicate that the compressor will already be in surge before the Surge Reference Line is reached. This situation is unacceptable as insufficient surge protection would be provided in such a case.

A similar process can be carried out to create a Choke Reference Line from a choke controlled variable which is also invariant to changes in the conditions at the inlet of the compressor, such as changes in the ratio of specific heats, for each equivalent performance curve.

In one embodiment, the controlled variable can be derived from a stream velocity, v, and a sonic velocity, $v_{sd}$, of the compressor feed stream at the inlet. The stream velocity, v, may be the average of a distribution of stream velocities at the inlet of the compressor. Such a controlled variable can be used to obtain a new family of surge and choke parameters which are invariant to compressor inlet conditions including the ratio of specific heats of the gas to be compressed.

It is preferred that the controlled variable is derived from the Mach number, which represents the ratio of the stream velocity v to sonic velocity $v_{sd}$ i.e. the fraction $$\frac{v}{v_{sd}}.$$

Ma can be given by the following equation:

$$Ma = \frac{v}{v_{sd}} = C_0 \cdot \Phi_{m_e} \quad [1]$$

where $C_0$ is a constant and $\Phi_{m_e}$ is the equivalent mass flow.

More preferably, the controlled parameter is derived from the Mach number squared, $Ma^2$, referred to herein as Mach squared. Mach squared is not dependent on any actual compressor inlet conditions and so is independent on the actual ratio of specific heats. Mach squared is preferred compared to Mach number because of a similarity with traditional surge parameters. However the Mach number may also be used. It will be apparent from equation [1] that Mach number only depends on equivalent mass flow. Lines of equal Mach number will therefore be vertical lines in the equivalent plot of FIG. 1. For example, the line of Mach number $Ma_1$ shown in FIG. 1 could be used as an approximate Surge Reference Line for compressor speeds up to 90%. The line $Ma_1$ defines a minimum equivalent mass flow value beyond which surge may occur. All the surge points for compressor speeds from 60-90% lie on, or to the left of this line. Thus, by operating the compressor at equivalent mass flows greater than $Ma_1$ at equivalent compressor speeds from 60-90%, surge will be avoided. Above 90% speed this line will not give protection because the surge point for 100% speed is on the right side of the line $Ma_1$.

In order to include a safety margin to protect the compressor against surge, a Surge Control Line can be produced which is to the right of the Surge Reference Line, for instance the line of Mach number $Ma_2$. This line may be produced at a number of percentage points above the equivalent mass flow surge point, for instance 15% (i.e. 115% of the surge point), in critical applications 25% (i.e. 125% of the surge point) above the surge point for a given equivalent compressor speed line. If remedial action, such as an increase in the equivalent mass flow, is initiated at or before the Surge Control Line, rather than the Surge Reference Line, it is less likely that the compressor will run into a surge condition.

In those cases in which the controlled variable, which is invariant to compressor inlet conditions, accurately represents the compressor's surge points, such as in the embodiment discussed in the next paragraph, a fixed set point, which is invariant to compressor inlet conditions, can be used. In those cases in which the controlled variable, which is invariant to compressor inlet conditions, does not provide an accurate model of the Surge Control Line over the operational range of the compressor, a variable set point, which is invariant to compressor inlet conditions, can be used.

In a preferred embodiment, a more accurate Surge Reference Line can be derived from the Mach number. In particular, multiplication of Mach squared and pressure ratio raised to a power constant, can provide a good fit for a Surge Reference Line. In this case, individual Surge Reference Values can be generated as shown in equation [2]:

$$S_{SRV} = C_5 \cdot Ma_{SRV}^2 \cdot \left(\frac{P_2}{P_1}\right)^{\gamma} = C_5 \cdot C_1 \cdot \Phi_{m_e SRV}^2 \cdot \left(\frac{P_2}{P_1}\right)^{\gamma} \quad [2]$$

wherein $\Phi_{m_e SRV}^2$ is the equivalent mass flow for a an equivalent pressure ratio $$\frac{P_2}{P_1}$$

at the Surge Reference Line, $Ma_{SRV}$ is the Mach number for a particular equivalent pressure ratio at the Surge Reference Line, $S_{SRV}$ is the value of the surge parameter at the Surge Reference Line and $C_5$, $C_1$ and $\gamma$ are constants.

A Surge Reference Line can therefore be plotted from equation [3]:

$$\left(\frac{P_2}{P_1}\right) = \left\{\frac{C_5 \cdot C_1}{S_{SRV}} \cdot \Phi_{m_e SRV}^2\right\}^{\left(-\frac{1}{\gamma}\right)} = C_6 \cdot (\Phi_{m_e SRV})^{\left(-\frac{2}{\gamma}\right)} \quad [3]$$

wherein $$C_6 = \left(\frac{C_5 \cdot C_1}{S_{SRV}}\right)^{\left(-\frac{1}{\gamma}\right)} \quad [4]$$

It will be apparent to the skilled person that a linear, polynomial or exponential function with Mach number can be developed to obtain useful parabolic shaped curves to fit the surge lines of compressors. An example of such a procedure is provided in Reference Example 1 below.

Furthermore, a family of controlled variables derived from the volumetric flow of the compressor feed stream through the compressor, Q, and the speed of the compressor, N, are also invariant to compressor inlet conditions, such as the ratio of specific heats.

In particular, the ratio of volumetric flow to compressor speed, Q/N can be expressed as the equation [5]:

$$\frac{Q}{N} = \frac{\Phi_{m_e}}{\rho_{1_r} \cdot N_e} \quad [5]$$

wherein $\Phi_{m_e}$ is the equivalent mass flow, $\rho_{1_r}$ is the density of the reference compressor feed stream at the inlet and $N_e$ is the equivalent compressor speed.

Using such families of controlled variables which are invariant to compressor inlet conditions, an equation defining the Surge Reference Line for an equivalent performance plot can be obtained. It is then possible to obtain a Surge Control Line, and this, or the Surge Reference Line, can be used as one boundary of the operational envelope in the method of controlling the compressor.

As a compressor approaches a surge condition, the problem of surge can be avoided by opening, or opening further an in-line recycle valve around the compressor. This action can be taken when a point on the Surge Reference or Surge Control Line is approached. When open, the in-line recycle valve increases the quantity of the compressed stream which is returned to the compressor feed stream along the compressor recycle line, thereby increasing the pressure at the inlet of the compressor, thus increasing the mass flow and moving the system away from a surge condition.

Similarly, equations defining Choke Reference or Choke Control Lines can be derived using (i) the compressor feed stream velocity and sonic velocity or (ii) volumetric flow and compressor speed, and the equivalent performance plots, in a similar manner to the surge reference and control lines discussed above.

The present embodiment also provides a more efficient method of controlling a compressor to avoid choking based on automatically controlling a downstream discharge valve, such as a throttling valve.

A combination of Choke Reference or Choke Control Lines and Surge Reference or Surge Control lines, can provide an operating window or envelope for the compressor.

The method of controlling the compressor enables the determination of the current operating point under which the compressor is operating relative to an acceptable operating window for the compressor by measuring compressor data. The automation of the method via a controller can allow the operation of the compressor to be altered quickly to reduce the likelihood of compressor problems such as compressor surge and choke.

The method operates by comparing the current operating point of the compressor as determined by the surge controlled variable with an anti-surge set point. If a difference in the values of the current operating point and anti-surge set point is observed, the speed of the compressor or the state of the in-line recycle valve is altered. For instance, a controller monitoring the surge controlled variable and the anti-surge set point can produce an electronic signal when a difference between the two values is detected. The signal from the controller can be transmitted to in-line recycle valve of the compressor recycle line, and controls the recycle of the compressed stream from the outlet of the compressor to the compressor feed stream at the inlet of the compressor in order to prevent surge. Alternatively, the signal can be transmitted to the driver of the compressor, thereby altering the speed of the compressor. The driver may be a turbine, such as a gas or steam turbine, or an electric motor.

In the method and apparatus disclosed herein, the set point is invariant to the compressor inlet conditions, such as the ratio of specific heats (Cp/Cv) of the compressor feed stream. The set point can be a constant value or a variable value. The set point defines the boundaries of the acceptable operating envelope of the compressor i.e. this operating envelope is comprised of the surge control line, choke control line and minimum and maximum equivalent speed lines. In those case where a variable value set point is used, this can be a function of the pressure ratio ($P_2/P_1$) or the ratio ($v/v_{sd}$).

In particular, it will be apparent that the classes of controlled variables described herein, which are invariant to the compressor inlet conditions, can give rise to set points which are also invariant to compressor inlet conditions, such as the ratio of specific heats of the compressor feed stream.

For instance, when the controlled variable is derived from the stream velocity of the compressor feed stream, sonic velocity of the compressor feed stream and the inlet ($P_1$) and outlet ($P_2$) pressures of the compressor e.g. the Mach number and the pressure ratio ($P_2/P_1$), the set point can be a constant value.

Alternatively, when the controlled variable is derived from the volumetric flow through the compressor (Q), the inlet ($P_1$) and outlet ($P_2$) pressures of the compressor and the speed of the compressor (N) e.g. Q/N and P2/P1, the set point can be a constant value. This is because a controlled variable which is derived from Q, N, $P_1$ and $P_2$ can be expressed as a function, such as a polynomial equation, which can accurately fit the Surge Line.

In the cases in which the set point is a constant value, this value is chosen with some safety margin higher than surge reference value for anti-surge control and with some safety margin lower than choke reference value for anti-choke control if applicable as shown in FIG. 1. These set points in fact define boundaries of acceptable operation envelope. In between these lines the surge parameter is higher than anti-surge set point such that anti-surge controller will keep recycle valve fully closed and the choke parameter is less than choke controller anti-choke set point such that discharge valve is kept fully open. In some cases, such as in U.S. Pat. No. 4,971,416, the controlled variable is derived from the volumetric flow through the compressor (Q) and the speed of the compressor (N), without also taking account of the inlet and outlet pressures of the compressor. Controlled variables derived from Q/N may not provide an acceptable fit for the surge characteristics for every compressor. For instance, the line derived from the controlled variable may cross the surge line. It could only provide useful compressor control when it entirely lies to the right of the Surge Line. For those conditions where the line derived from the controlled variable lies to the left of the Surge Line, the compressor would already be in surge, such that remedial action would be too late.

This can be remedied by the use of a variable set point, which is invariant to compressor inlet conditions, derived from, for example (i) the speed of the compressor (N) and the sonic velocity ($v_{sd}$) of the compressor feed stream or (ii) the pressure $P_1$ of the compressor feed stream at the compressor inlet and the pressure $P_2$ of the compressed stream at the compressor outlet.

For example, a set point derived from the speed of the compressor (N) and the sonic velocity ($v_{sd}$) of the compressor feed stream can be used, as shown in equation [6]:

$$\frac{N}{v_{sd}} = N_e \cdot \sqrt{\frac{M_r}{\kappa_{1_r} \cdot Z_{1_r} \cdot R \cdot T_{1_r}}} \qquad [6]$$

wherein $N_e$ is the reference compressor speed, $\kappa_{1_r}$ is the reference ratio of specific heats of the compressor feed stream, $Z_{1_r}$ is the reference compressibility factor of the compressor feed stream, R is the ideal gas constant and $T_{1_r}$ is the reference temperature of the compressor feed stream. It is apparent that the ratio $$\frac{N}{v_{sd}}$$

is only dependent upon reference speed, constants and reference conditions which are constants. Equation [6] is thus fully invariant to compressor inlet conditions such as the actual ratio of specific heat.

In this case, the set point is not a constant value but a variable, which must be recalculated continuously. With a variable set point, multiple Surge Control Lines can be obtained, each one for a different set point. The method disclosed herein operates to track such a variable set point, and maintain the operation of the compressor at anti-surge controller anti-surge set point or above and at anti-choke controller anti-choke set point or below in similar way as defined for situation with fixed set points. In this case variable anti-surge controller anti-surge set points and variable anti-choke control anti-choke set points define boundaries of acceptable envelope for particular compressor.

Alternatively, if a fixed set point is desired, the measured variable can be refined, for instance by multiplying $Ma^2$ or $Q/N$ with functions of further invariant terms such as $N/v_{sd}$ or $P_2/P_1$.

The method disclosed herein can be contrasted with that described in U.S. Pat. No. 4,971,516 which discloses a variable set point determined from the sonic velocity, $v_{sd}$. Sonic velocity can be represented by the following equation:

$$\overline{v_{sd}} = N_e \cdot \sqrt{\frac{\kappa_{1_a} \cdot Z_{1_a} \cdot R \cdot T_{1_a}}{M_a}} \quad [B]$$

in which $\kappa_{1_a}$ is the actual ratio of specific heats of the compressor feed stream, $Z_{1_a}$ is the actual compressor inlet compressibility factor, R is the ideal gas constant, $T_{1_a}$ is the actual compressor inlet temperature and $M_a$ is the actual molecular weight of the gas comprising compressor feed stream.

U.S. Pat. No. 4,971,516 also suggests that the set point can also be determined from the compressor speed N. For an equivalent compressor speed, $N_e$, the following equation applies:

$$N_e = N_a \cdot \sqrt{\frac{\kappa_{1_r} \cdot Z_{1_r} \cdot T_{1_r} \cdot M_r}{\kappa_{1_a} \cdot Z_{1_a} \cdot T_{1_a} \cdot M_a}} \quad [C]$$

wherein $N_a$ is the actual compressor speed, $\kappa_{1_r}$ and $\kappa_{1_a}$ are the reference and actual ratio of specific heats respectively of the compressor feed stream, $Z_{1_r}$ and $Z_{1_a}$ are the reference and actual compressor inlet compressibility factors respectively, $T_{1_r}$ and $T_{1_a}$ are the reference and actual compressor inlet temperatures respectively and $M_r$ and $M_a$ are the real and actual molecular weights of the gas comprising the compressor feed stream respectively.

It is apparent that the set points utilised in U.S. Pat. No. 4,971,516 are dependent upon the conditions at the inlet of the compressor, such as the actual ratio of specific heats of the compressor feed stream, the actual compressor inlet compressibility factor, the actual compressor inlet temperature and the actual molecular weight of the gas comprising the compressor feed stream. These variables are all dependent on the compressor inlet conditions, and thus cannot provide a set point which is invariant to such inlet conditions.

As disclosed herein, the invariant controlled variable may be derived from one or more the group comprising: Ma, $Q/N$, $P_2/P_1$, $N/v_{sd}$ and $Q/v_{sd}$. These properties can also be used in combination to provide mathematic functions, such as logarithmic, exponential, trigonometric, hyperbolic and polynomial expressions. For instance, equation [2] describes a surge parameter obtained from multiplying the square of the Mach number Ma with the ratio of the outlet to the inlet pressures of the compressor raised to the power γ i.e.

$$\left(\frac{P_2}{P_1}\right)^\gamma,$$

in which γ is a constant. In such a case, the measured value in general will fit well with surge or choke characteristics of a particular compressor and the set point can be constant.

In case measured value is $Ma^2$ or $Q/N$, a variable set point can be defined with for instance expression expression [7]:

$$a \cdot \left(\frac{P_2}{P_1}\right)^2 + b \cdot \left(\frac{P_2}{P_1}\right) + c \quad [7]$$

in which a, b and c are constants and $P_2$ and $P_1$ are as already defined. Similar expressions can also be developed with $v_{sd}/N$ as independent variables in stead of the pressure ratio $P_2/P_1$. The constants can be set to fit the expression to the Surge Control Line, such that a constant margin between the Surge Line and Surge Control Line is achieved, as shown in FIG. 1. When the operation of the compressor moves left of the Surge Control Line, the anti-surge controller will engage, such as by opening a compressor bypass line, in order to protect the compressor stage. Similar system can be developed for anti-choke control.

Table 1 lists a number of preferred embodiments disclosed herein having invariant controlled variables and invariant set points.

TABLE 1

Examples of set points and invariant controlled variables applicable for both anti surge as well as anti choke control

| | Controlled variable | Controlled variable invariant? | Set point | Set point invariant? |
|---|---|---|---|---|
| U.S. Pat. No. 4,971,516 | Q/N | Yes | $f(v_{sd})$ | No dependent on T, Z, κ, M |
| U.S. Pat. No. 4,971,516 | Q/N | Yes | f(N) | No dependent on T, Z, κ, M |
| Embodiment 1 | Q/N | Yes | $f(N/v_{sd})$ | Yes, variable |
| Embodiment 2 | Q/N | Yes | f(Ma) | Yes, variable |
| Embodiment 3 | Q/N | Yes | $f(P_2/P_1)$ | Yes, variable |
| Embodiment 4 | Q/N, $N/v_{sd}$ | Yes | Fixed | Yes |
| Embodiment 5 | Q/N, $P_2/P_1$ | Yes | Fixed | Yes |
| Embodiment 6 | Ma | Yes | $f(N/v_{sd})$ | Yes, variable |
| Embodiment 7 | Ma | Yes | $f(P_2/P_1)$ | Yes, variable |
| Embodiment 8 | Ma, $N/v_{sd}$ | Yes | Fixed | Yes |
| Embodiment 9 | Ma, $P_2/P_1$ | Yes | Fixed | Yes | wherein the term "f" denotes a function of the specified variables

Figure 2:
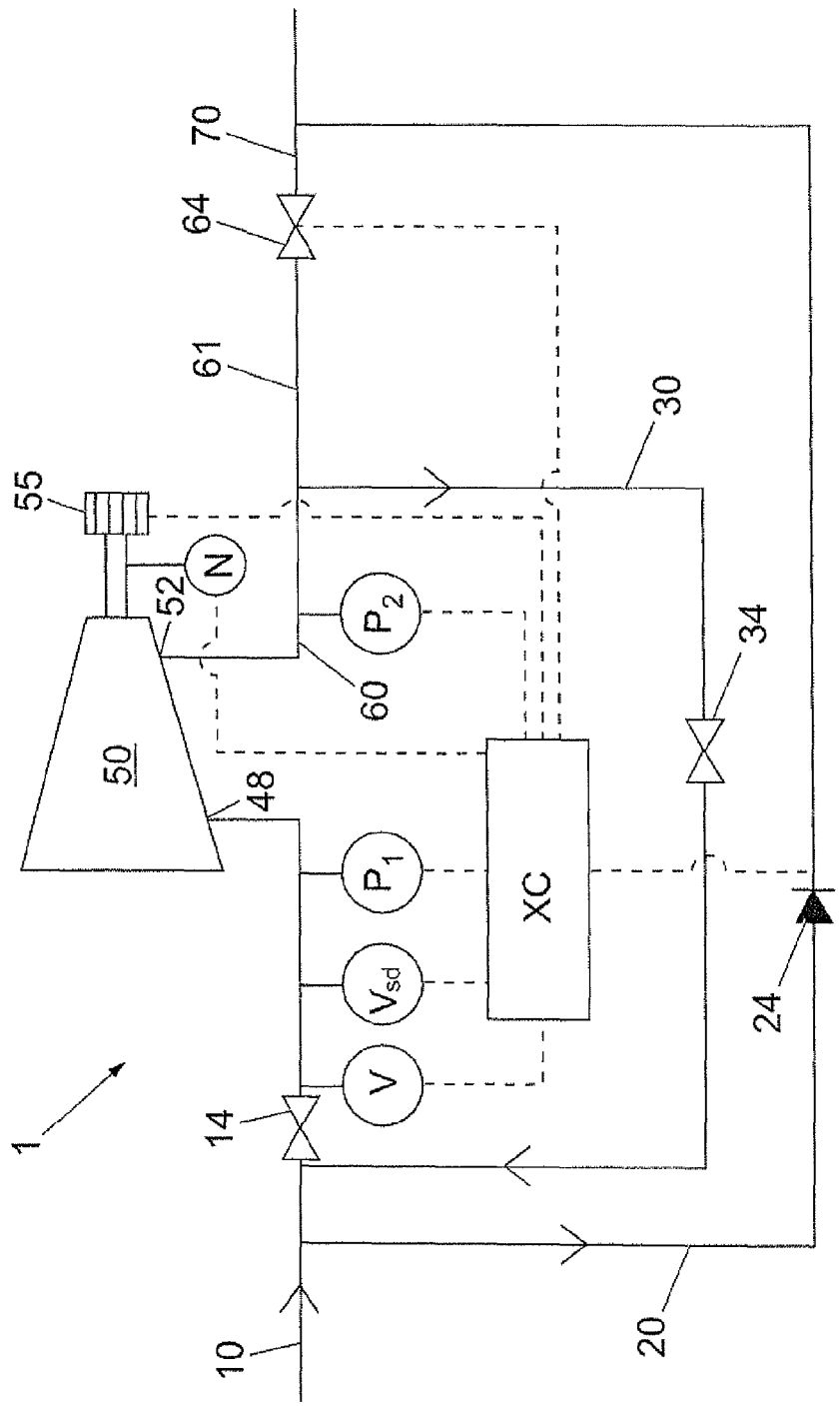
FIG. 2 is a diagrammatic scheme for a method of controlling a compressor according to one embodiment of the present invention.

Referring to the drawings, FIG. 2 shows various embodiments of methods for controlling a compressor 50 for compressing a compressor feed stream 10 as part of an apparatus 1.

The apparatus 1 may be a refrigerant compressor apparatus in a Liquefied Natural Gas (LNG) plant. Natural gas is a useful fuel source, as well as being a source of various hydrocarbon compounds. It is often desirable to liquefy natural gas in a liquefied natural gas (LNG) plant at or near the source of a natural gas stream for a number of reasons. As an example, natural gas can be stored and transported over long distances more readily as a liquid than in gaseous form because it occupies a small volume and does not need to be stored at high pressure.

Usually, natural gas, comprising predominantly methane, enters an LNG plant at elevated pressures and is pre-treated to produce a purified feed stream suitable for liquefaction at cryogenic temperatures. The purified gas is processed through a plurality of cooling stages using heat exchangers to progressively reduce its temperature until liquefaction is achieved. The liquid natural gas is then further cooled and expanded to final atmospheric pressure suitable for storage and transportation.

In addition to methane, natural gas usually includes some heavier hydrocarbons and impurities, including but not limited to carbon dioxide, sulphur, hydrogen sulphide and other sulphur compounds, nitrogen, helium, water and other non-hydrocarbon acid gases, ethane, propane, butanes, $C_5+$ hydrocarbons and aromatic hydrocarbons. These and any other common or known heavier hydrocarbons and impurities either prevent or hinder the usual known methods of liquefying the methane, especially the most efficient methods of liquefying methane. Most if not all known or proposed methods of liquefying hydrocarbons, especially liquefying natural gas, are based on reducing as far as possible the levels of at least most of the heavier hydrocarbons and impurities prior to the liquefying process.

Impurities such as sulphur, hydrogen sulphide and other sulphur compounds are typically removed by hydrodesulphurization in a hydrotreating unit. Sulphur and other sulphur compounds are converted to hydrogen sulphide in a catalytic hydrogenolysis reaction. The hydrogen sulphide is then removed in an amine gas treating unit.

Hydrocarbons heavier than methane and usually ethane are typically condensed and recovered as natural gas liquids (NGLs) from a natural gas stream. The NGLs are usually fractionated to yield valuable hydrocarbon products, either as products steams per se or for use in liquefaction, for example as a component of a refrigerant.

Meanwhile, methane recovered from the NGL recovery is usually recompressed for use or reuse either in the liquefaction, such as a fuel gas, or being recombined with the main methane stream being liquefied, or it can be provided as a separate stream.

When the method and apparatus of the present invention is used in a LNG plant, the compressor feed stream 10 could be any suitable refrigerant stream, such as propane in operational mode, and a stream comprising nitrogen in maintenance mode.

The apparatus 1 may alternatively be a regeneration gas compressor apparatus in a hydrodesulphurization unit, for instance for the treatment of natural gas in a LNG plant, in which case the compressor feed stream 10 will comprise a gas capable of sustaining combustion, such as an oxygen-comprising composition. The concentration of oxygen may be, for example from 1 to 10% by volume, preferably 1 to 4% by volume.

The compressor 50 is driven by a driver 55, which may be a turbine, especially a gas or steam turbine. The compressor 50 has a inlet 48 and outlet 52 and is able to compress at least a fraction of the compressor feed stream 10 to provide a compressed stream 60 in a manner known in the art.

Between the outlet 52 and inlet 48 of the compressor 50, there is a compressor recycle line 30 which is able to take at least a fraction of the compressed stream 60 and recycle it back into the path of the compressor feed stream 10, upstream of a suction valve 14. The compressor recycle stream 30 is added to compressor feed stream 10. The division of the compressed stream 60 between a compressed continuing stream 61 and a compressor recycle stream 30 may be carried out by any suitable divider or stream splitter known in the art. The division of the compressed stream 60 may be anywhere between 0-100% for each of the compressed continuing stream 61 and compressor recycle stream 30 as discussed further hereinafter.

The compressor recycle line 30 is a dedicated line around the compressor 50. The compressor recycle line 30 includes one or more control valves 34, required to change the pressure of the compressor recycle stream 30 to approximate or equate its pressure to the intended pressure of the compressor feed stream 10 for the suction side of the compressor 50.

Optionally, the compressed line 60 providing the compressed stream 60, may include one or more coolers, such as one or more water and/or air coolers, to reduce the temperature of at least the compressor recycle stream 30 prior to its re-introduction into the inlet 48 of the compressor 50.

The measurement of the stream velocity v by measurer v and the sonic velocity $v_{sd}$ by measurer $v_{sd}$ of the compressor feed stream 10 can be carried out by an ultrasonic flowmeter, which simultaneously provides the cross sectional area averaged gas velocity as well as the speed of sound of the gas at the sensor. These measurements enable the derivation of a surge controlled variable CO1 which can be used to determine whether the Surge Reference or Surge Control Line is being approached. If necessary, remedial action can be taken by adjusting one or both of the in-line recycle valve and compressor speed to avoid surge.

In an alternative embodiment also shown in FIG. 2, the sonic velocity $v_{sd}$ can be measured by measurer $v_{sd}$, for instance by an ultrasonic flow meter, and used to determine the volumetric flow, Q. The speed N of the compressor is measured by measurer, N, which can be a counter. These measurements enable the derivation of a surge controlled variable CO1, such as Q/N, which can be used to determine whether the Surge Reference or Surge Control Line is being approached. If necessary, remedial action can be taken by adjusting one or both of the in-line recycle valve 34 and compressor speed to avoid surge. The same measurements can enable the derivation of a choke controlled variable CO2 to determine whether the choke control line is approached. If needed, remedial action can be taken by the controller XC to adjust discharge valve 64 to avoid stonewall operation.

FIG. 2 exemplifies one embodiment of the method disclosed herein comprising at least the steps of:

(a) providing a compressor feed stream (10);

(b) passing the compressor feed stream (10) to an inlet (48) of the compressor (50) to provide a compressed stream (60) at an outlet (52) of the compressor (50);

(c) calculating one or more controlled variables (CO1, CO2) that are invariant to compressor inlet conditions of the compressor feed stream (10), said inlet conditions comprising at least the ratio of specific heats (Cp/Cv) of the compressor feed stream (10), said one or more controlled variables comprising a surge controlled variable (CO1) representing the surge characteristics of the compressor (50);

(d) providing one or more set points (SP1, SP2), that are invariant to the compressor inlet conditions of the compressor feed stream (10), said inlet conditions comprising at least the ratio of specific heats (Cp/Cv) of the compressor feed stream (10), said one or more set points comprising an anti-surge set point (SP1);

(e) providing a compressor recycle line (30) around the compressor (50) from the compressed stream (60) to upstream of the inlet (48) of the compressor (50), said compressor recycle line (30) comprising a in-line recycle valve (34);

(f) controlling at least one of the in-line recycle valve (34) and the speed of the compressor (50) in response to the difference between the surge controlled variable (CO1) calculated in step © and the anti-surge set point (SP1) provided in step (d).

In a further embodiment:

in step (c) the one or more controlled variables (CO1, CO2) further comprise a choke controlled variable (CO2);

in step (d) the one or more set points (SP1, SP2) further comprises an anti-choke set point (SP2); and further comprising the steps of:

(g) passing the compressed stream (60) through at least one discharge valve (64), such as a throttling valve, downstream of the compressor recycle line (30) to provide a controlled stream (70); and (h) providing a compressor bypass line (20) around the discharge valve (64) and the compressor (50), from the compressor feed stream (10) to the controlled stream (70), said compressor bypass line (20) having a bypass valve (24); and (i) controlling the discharge valve (64) in response to the difference to the difference between the choke controlled variable (CO2) and the anti-choke set point (SP2).

FIG. 2 shows measurement values v (and thereby volumetric flow rate Q) and $v_{sd}$ or $v_{sd}$ and N and optionally $P_1$ and $P_2$ being passed along dashed signal paths to the controller XC, which computes the measurement values to calculate the controlled variables CO1 for anti-surge control and CO2 for anti-choke control. The anti-surge controlled variable CO1 determines the operation of the compressor relative to the Surge Reference or Surge Control Lines, and sends control signals the in-line recycle valve 34 to control its operation, and hence the flow of the compressor recycle stream 30 to avoid the surge of the compressor 50. The anti-choke controlled variable determines the operation of the compressor relative to the Choke Reference or Choke Control Lines, and sends control signals to discharge valve 64 to control its operation, and hence the flow of the compressor discharge stream 70 to avoid choke of the compressor 50.

It is preferred that the method further comprises the step of determining the first pressure $P_1$ of the compressor feed stream 10 and the second pressure $P_2$ of the compressed stream 60 to provide a pressure ratio $P_2/P_1$, and using this ratio in the determination of the controlled variable.

The presently disclosed method and apparatus is not limited by the form of measuring the pressures $P_1$ and $P_2$.

A pressure value can be taken using any suitable pressure measurer such as a hydrostatic measurer, for example a piston or liquid column, an aneroid measurer such as a Bourdon gauge, a diaphragm or bellow or a thermal conductivity measurer.

In a preferred embodiment, by measuring the pressure $P_1$ of the compressor stream 10 and the pressure $P_2$ of the compressed stream 60 it is possible to accurately determine the operation of the compressor 50 relative to its Choke Reference or Choke Control Line. The pressure ratio $P_2/P_1$ can be obtained from these pressure values and converted to an equivalent performance pressure ratio which can then be used to determine the operational point of the compressor on the equivalent performance plot.

The automatic control of the recycle valve 34 can be based on non-user computation of the stream velocity v (and thereby volumetric flow rate Q) and sonic velocity $v_{sd}$ or volume flow rate Q and compressor speed N and optionally pressure measurements described herein. Such control can be provided by the use of one or more automatic controllers known in the art, represented in FIG. 1 as a controller "XC", able to compute the controlled variables CO1, CO2 in step (c) and compare this to the set points SP1, SP2 provided in step (d), and directly provide one or more control instructions to automatically control the in-line recycle valve 34 in the compressor recycle line 30 so as to control the discharge pressure $P_2$ and suction pressure $P_1$ of the compressor 50 to prevent surge as well as providing control instructions to automatically control discharge valve 64 in compressor discharge to prevent the choking of compressor 50 based upon the difference between the controlled variables CO1, and CO2 and their respective set points SP1, SP2.

The compressed continuing stream 61 is passed through a discharge valve 64, such as a throttling valve, to provide the controlled stream 70.

The choke controlled variable CO2 calculated in step (c) can be used to determine the operation of the compressor 50 relative to its Choke Control or Choke Reference Line.

By controlling the discharge valve 64 in response to the difference between the choke controlled variable CO2 and anti-choke set point SP2, it is possible to throttle the pressure of the compressed continuing stream 61 to approximate or equate its pressure to that of the compressor feed stream 10. This allows at least a part of the compressor feed stream 10 to bypass the compressor 50 along compressor bypass line 20. By bypassing the compressor 50, the pressure $P_1$ in the compressor feed stream 10 is reduced, increasing the pressure ratio ($P_2/P_1$) and mass flow, thereby moving away from a choking condition. This can be done through the same controller(s) such as the controller XC shown in FIG. 2.

Figure 3:
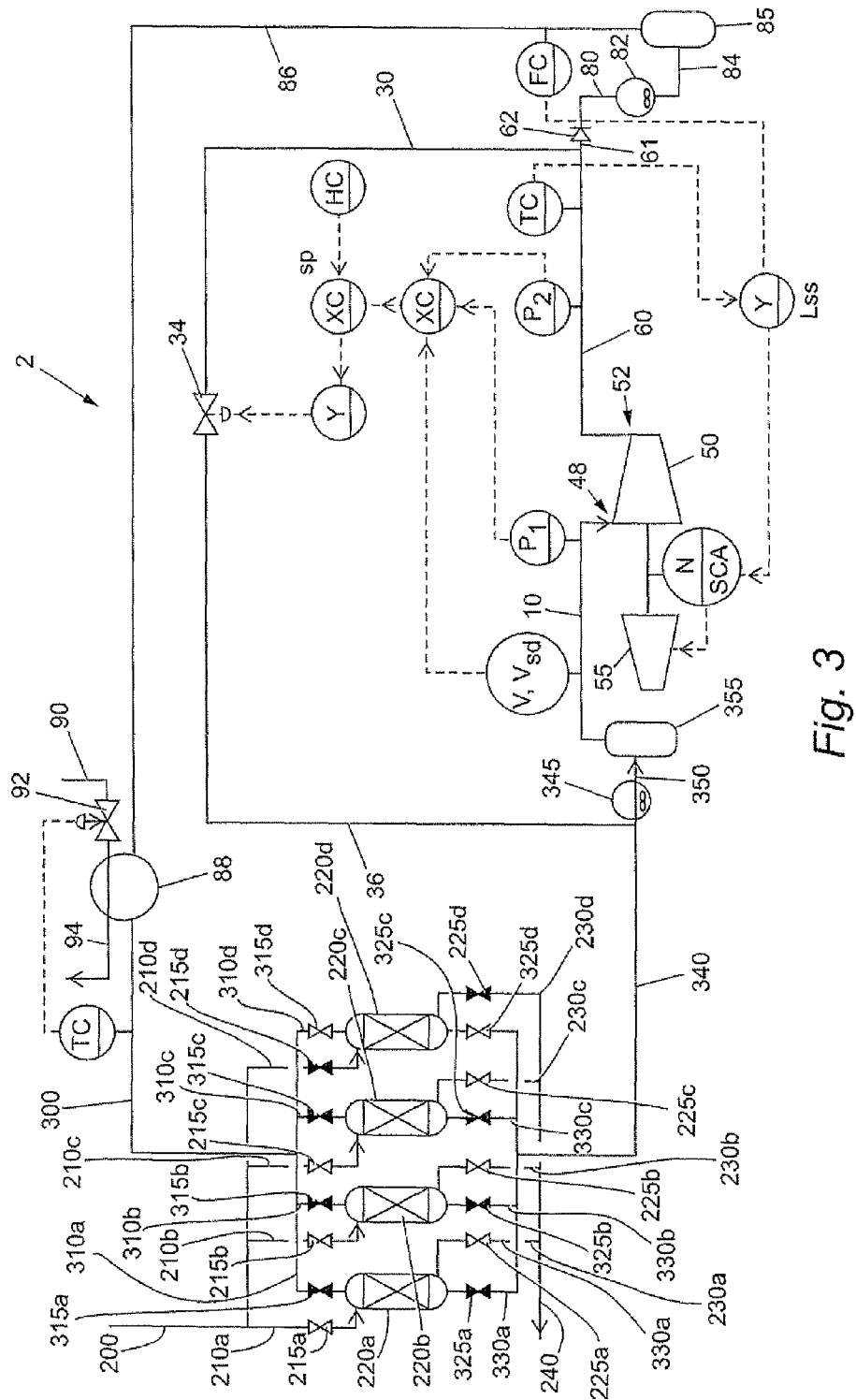
FIG. 3 is a diagrammatic scheme for a method of controlling a compressor in a hydrotreating plant.

FIG. 3 shows the operation of the apparatus disclosed herein in a hydrotreating plant 2, such as a hydrodesulphurisation plant. Hydrodesulphurisation is a catalytic chemical process for the removal of sulphur from natural gas and petroleum products.

A process gas stream 200, comprising for instance natural gas and hydrogen, is split into part process gas streams 210a-d. Part process gas streams 210a-d are passed through first process gas valves 215a-d to reactors 220a-220d respectively. Reactors 220a-d contain fixed bed hydrodesulphurisation catalysts which eliminate sulphur from sulphur-containing hydrocarbons to produce hydrogen sulphide. Such reactions normally occur at temperatures ranging from 300 to 400° C. and pressures ranging from 30 to 130 atmospheres absolute. The catalyst may be an alumina base impregnated with cobalt and molybdenum.

The gaseous product from reactors 220a-d comprises hydrogen sulphide, and for instance natural gas or the petroleum product and is removed as part product streams 230a-d, which pass through second reactor valves 225a-d prior to combination into combined product stream 240. The combined product stream is sent for further treatment, such as the removal of the hydrogen sulphide in an amine treating unit.

In the embodiment shown in FIG. 3, reactors 220a, 220b and 220c are processing the process gas because first reactor valves 215a, b and c and second reactor valves 225a, b and c are open.

The activity of the catalysts used in the reactors 220a-d may decrease over time due to the build-up of carbonaceous deposits. Reactors 220a-d can be periodically taken off-line for the regeneration of the catalysts. During regeneration, a heated regeneration gas stream 300 split into four part regeneration gas streams 310a-d is passed through third reactor valves 315a-d to reactors 220a-d. The regeneration gas is normally a gas sustaining combustion, such as an oxygen-comprising gas, as discussed above. Regeneration of the catalyst is carried out by burning off the carbonaceous deposits using the regeneration gas.

The spent regeneration gas exits the reactors 220a-d as part spent regeneration streams 330a-d, passing through fourth reactor valves 325a-d respectively. Part spent regeneration streams 330a-d are combined into combined spent regeneration stream 340.

In the embodiment shown in FIG. 3, reactor 220d is under regeneration. Third and fourth reactor valves 315d and 325d are open, allowing inflow of the part regeneration gas stream 310d, while first and second reactor valves 215d and 225d are closed, preventing inflow of part process gas stream 210d or part product stream 230d respectively.

Combined spent regeneration stream 340 is cooled in air cooler 345 to provide cooled regeneration stream 350. Cooled regeneration stream 350 is passed to first knock-out drum 355, where a compressor feed stream 10, which is a regeneration gas compressor feed stream, is withdrawn form the top of the drum. The compressor feed stream 10 is compressed in compressor 50 controlled by the method disclosed herein as discussed for FIG. 2.

Compressor 50 provides a compressed stream 60, a portion of which can be withdrawn along recycle line 30 and passed upstream of the compressor 50, to combined spent regeneration stream 340, to prevent surge. The remaining portion of compressed stream 60 is passed through a one-way valve 62 as compressed continuing stream 61 to provide compressed regeneration stream 80. Compressed regeneration stream 80 is cooled by air cooler 82 to provide cooled compressed regeneration stream 84, which is passed to a second knock-out drum 85 to provide a top regeneration stream 86.

Top regeneration steam 86 may be optionally dried in an embodiment not shown, before being passed to steam heater 88. In steam heater 88, heated steam stream 90 is heat exchanged against the top regeneration stream 86 to provide regeneration gas stream 300 and steam stream 94. Temperature controller TC detects the temperature of regeneration gas stream 300 and controls heater valve 92 to alter the flow rate of heated steam stream 90 through steam heater 88 to provide the desired temperature for regeneration gas stream 300. Regeneration gas stream 300 is normally provided with a temperature in the range of 300 to 600° C., which is suitable for regeneration of the hydrodesulphurization catalyst in the reactors 220a-d.

For simplicity, the suction valve between the connection of the compressor recycle line 30 upstream of the compressor 50 and the compressor inlet 48, the compressor bypass line and the discharge valve in the compressed stream 60 are not shown in FIG. 3. However, a similar construction as that shown in the apparatus of FIG. 2 could be provided in the embodiment of FIG. 3 for the purpose of choke control.

Figure 4:
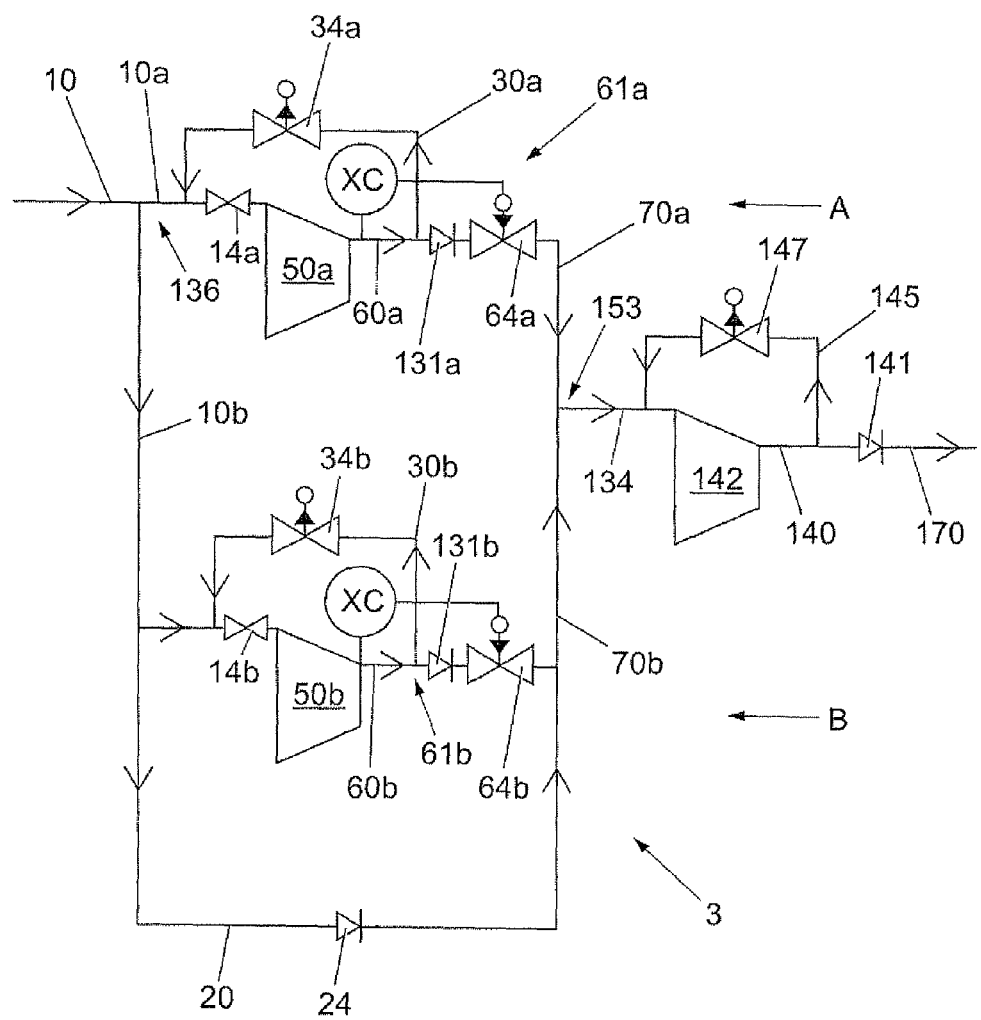
FIG. 4 is a diagrammatic scheme for a method of controlling two parallel compressors according to a further embodiment of the present invention.

FIG. 4 shows a second compression apparatus 3 having a first compressor string A and a second compressor string B. For simplicity, controller XC and measurers v, $v_{sd}$, N, $P_1$ and $P_2$ have been omitted from FIG. 4.

In FIG. 4, compressor feed stream 10 is divided by a stream splitter 136 in a manner known in the art to provide at least two part-compressor feed streams 10a, 10b which pass respectively through two suction valves 14a, 14b into the two compressors 50a, 50b through their inlets to provide two respective compressed streams 60a, 60b. 0-100% of the compressed streams 60a, 60b may pass into two respective compressor recycle lines 30a, 30b for recycle through respective control valves 34a, 34b and return to the suction sides of the two compressors 50a, 50b as described hereinabove.

That fraction of each of the compressed streams 60a and 60b not passing into the compressor recycle lines 30a, 30b provide compressed continuing streams 61a, 61b which can pass through respective one-way valves 131a, 131b and discharge valves 64a, 64b, such as throttling valves, to provide controlled streams 70a, 70b before being combined by a combiner 153 to provide a combined downstream compressor feed stream 134 which passes to a downstream compressor 142 to provide a downstream compressed stream 140. A fraction of between 0-100% of the downstream compressed stream 140 can provide a downstream compressor recycle stream 145, which can contain one or more control valves 147, whilst a final compressed stream 170, is produced by passing through one-way valve 141.

The combination of the compressor 50a, and its associated lines provides the first string A, whilst the second compressor 50b, and its associated lines, provides the second string B.

The user of the system 3 is provided with greater options and flexibility concerning the flow of the compressor feed stream 10 through system 3, in particular operations and flows through compressors 50a, 50b. As well as providing operational advantages during normal and/or conventional running of such a system, this arrangement provides two further advantages.

Firstly, should either string of system 3 not be able to run normally, either by accident or design, throughput can be maintained through the other string. In particular, where a string should 'trip', then the other string is able to continue operation even if the volume and/or mass of the compressor feed stream 10 continues at the same level, or continues at a significant level.

The 'tripping' of a string can occur for a number of reasons, and/or in a number of situations. Common examples include 'overspeed', for instance where the driver produces more power than that required by the compressor and 'vibration' when the compressor is operating beyond the flow envelope and the flow angle with respect to the vane angle is incorrect.

A second particular advantage of the system 3 shown in FIG. 4 is during start-up. By providing two or more strings, each string can be separately started at a different time, and optionally with different starting parameters than each other strings. Thus, the user has greater options and control over the start-up of all the strings prior to full and normal operation of the system 3.

As an example, at the start-up of system 3, the compressor feed stream 10 can pass through the bypass line 20, and one-way valve 24 to bypass the compressors 50a, 50b, especially where these are not provided with power or otherwise driven.

It is a particular advantage of the method and apparatus disclosed herein that through pressure control of each bypass stream and each part-stream, as the flow of the compressor feed stream 10 increases during start-up, one or more of strings A, B can be separately started and brought up to normal operation as a controlled procedure. Thus, the two throttle control valves 64a, 64b in the paths of the compressor continuing streams 61a, 61b, allow control of the introduction of each compressor feed stream 10a, 10b into the compressors 50a, 50b in combination with reduction of the flow of the bypass stream 20. The two throttle valves 64a, 64b can control the pressure at the discharge of each of the compressors 50a, 50b, especially near choking of each compressor 50a, 50b, which most usually can occur during start-up and following any tripping of a string.

In this way, the pressure of the stream in the bypass line 20 does not hinder the start-up of each of the compressors 50a, 50b, either together or independently. This arrangement seeks to ensure maximum forward flow through the or each compressor, (and hence no overheating), without operating in the choking region.

It is a further advantage of the system 3 that one or more of the compressors 50a, 50b can be isolated from the or each other compressors, so as to reduce interaction between the compressors 50a, 50b.

REFERENCE EXAMPLE 1

A compressor was provided with the pressure ratio and surge points for 3 different equivalent speeds shown in Table 2.

TABLE 2

| Pressure ratio/ ($P_2/P_1$) | Surge point/ (kg/s) | $\Phi_{m_eSRV}$/ (kg/s) |
|---|---|---|
| 1.43 | 431.895 | 431.895 |
| 1.31 | 359.912 | 359.930 |
| 1.18 | 287.930 | 289.617 |

By fitting inverted equation [3], i.e.

$$\Phi_{m_eSRV} = \left(\frac{\left(\frac{P_2}{P_1}\right)^{(-\frac{\gamma}{2})}}{C_6}\right) \quad [8]$$

to the pressure ratio and surge points, equation [8] in which $C_6$ is 0.07729 and the exponent is −4.15927 (i.e. γ is 8.31853) was obtained. The Surge Reference equivalent mass flow values ($\Phi_{m_eSRV}$) calculated from the solution to equation [8] are also shown in Table 2. It is apparent that these present a good match for the surge points. This solution to equation [8] can therefore be used to generate Surge Reference Values and therefore a Surge Reference Line. This Surge Reference Line or a Surge Control Line derived from it can be used in the controller (XC) to regulate the operation of the compressor shown in FIG. 1 to avoid surge.

A person skilled in the art will readily understand that the present invention may be modified in many ways without departing from the scope of the appended claims.

What is claimed is:

1. A method of controlling a compressor comprising:
   (a) providing a compressor feed stream;
   (b) passing the compressor feed stream to an inlet of the compressor to provide a compressed stream at an outlet of the compressor;
   (c) calculating one or more controlled variables (CO1, CO2) that are invariant to compressor inlet conditions of the compressor feed stream, said inlet conditions comprising at least the ratio of specific heats (Cp/Cv) of the compressor feed stream, said one or more controlled variables comprising a surge controlled variable (CO1) representing the surge characteristics of the compressor;
   (d) providing one or more set points, that are invariant to the compressor inlet conditions of the compressor feed stream, said inlet conditions comprising at least the ratio of the specific heats (Cp/Cv) of the compressor feed stream, said one or more set points comprising an anti-surge set point (SP1) corresponding to a surge control line which is invariant to the compressor inlet conditions;
   (e) providing a compressor recycle line around the compressor from the compressed stream to upstream of the inlet of the compressor, said compressor recycle line comprising an in-line recycle valve;
   (f) controlling at least one of the in-line recycle valve and the speed of the compressor in response to the difference between the surge controlled variable (CO1) calculated in step (c) and the anti-surge set point (SP1) provided in step (d).

2. The method according to claim 1 wherein the one or more controlled variables (CO1, CO2) are derived from at least one of the following parameters:
   (i) the stream velocity (v) of the compressor feed stream and the sonic velocity ($v_{sd}$) of the compressor feed stream and
   (ii) the volumetric flow (Q) of the compressor feed stream through the compressor and the speed of the compressor (N).

3. The method according to claim 2 in which the sets of parameters used to derive the one or more controlled variables (CO1 and CO2) further comprise at least one of the following: (a) the outlet pressure ($P_2$) of the compressed stream, and the inlet pressure ($P_1$) of the compressor feed stream; and (b) the compressor speed (N) of the compressor and the sonic velocity ($v_{sd}$) of the compressor feed stream.

4. The method according to claim 3 wherein the one or more set points (SP1, SP2) are constant value.

5. The method according to claim 2 wherein the one or more set points are variables derived from the sets of parameters comprising:
   (1) the compressor speed (N) of the compressor and the sonic velocity ($v_{sd}$) of the compressor feed stream; and
   (2) the outlet pressure (P) of the compressed stream and the inlet pressure ($P_1$) of the compressor feed stream.

6. The method according to claim 1, wherein the one or more controlled variables (CO1 CO2) are derived from the Mach number (Ma) by dividing stream velocity (v) of the compressor feed stream by the sonic velocity ($v_{sd}$) of the compressor feed stream:

$$Ma = \frac{v}{v_{sd}}.$$

7. The method according to claim 1, wherein in step (f) the in-line recycle valve is automatically controlled in response to the difference between the surge controlled variable (CO1) calculated in step (c) and the anti-surge set point SP1 provided in step (d) for anti-surge control.

8. The method according to claim 1, wherein:
   the compressor feed stream is divided into two or more part feed streams, to pass through two or more compressors to provide two or more compressed streams; and
   wherein steps (b) to (f) of claim 1 are carried out on each part feed stream, each compressed stream, each compressor and each in-line recycle valve.

9. The method according to claim 2, wherein the stream velocity (v) of the compressor feed stream and the sonic velocity ($v_{sd}$) of the compressor feed stream are measured by an ultrasonic flow meter.

10. The method according to claim 1 wherein:
    in step (c) the one or more controlled variables (CO1, CO2) comprises a choke controlled variable (CO2);
    in step (d) the one or more set points (SP1, SP2) comprises an anti-choke set point (SP2).

11. The method according to claim 10, wherein the compressor feed stream in step (b) passes to the inlet of the compressor through a suction valve, and further comprising a step of controlling the suction valve in response to the difference between the choke controlled variable (CO2) and the anti-choke set point (SP2).

12. The method according to claim 10, wherein the compressed stream is divided into two or more compressed streams to pass through two or more discharge valves to provide two or more controlled streams.

13. The method according to claim 1, further comprising a controller (XC) to operate the in-line recycle valve in response to the difference between the surge controlled variable (CO1) calculated in step (c) and the anti-surge set point (SP1) provided in step (d).

14. A method of controlling a compressor comprising:
(a) providing a compressor feed stream;
(b) passing the compressor feed stream to an inlet of the compressor to provide a compressed stream at an outlet of the compressor;
(c) calculating one or more controlled variables (CO1, CO2) that are invariant to compressor inlet conditions of the compressor feed stream, said inlet conditions comprising at least the ratio of specific heats (Cp/Cv) of the compressor feed stream, said one or more controlled variables comprising a surge controlled variable (CO1) representing the surge characteristics of the compressor;
(d) providing one or more set points, that are invariant to the compressor inlet conditions of the compressor feed stream, said inlet conditions comprising at least the ratio of the specific heats (Cp/Cv) of the compressor feed stream, said one or more set points comprising an anti-surge set point (SP1);
(e) providing a compressor recycle line around the compressor from the compressed stream to upstream of the inlet of the compressor, said compressor recycle line comprising an in-line recycle valve;
(f) controlling at least one of the in-line recycle valve and the speed of the compressor in response to the difference between the surge controlled variable (CO1) calculated in step (c) and the anti-surge set point (SP1) provided in step (d); wherein:
in step (c) the one or more controlled variables (CO1, CO2) comprises a choke controlled variable (CO2);
in step (d) the one or more set points (SP1, SP2) comprises an anti-choke set point (SP2); and
further comprising the steps of:
(a) passing the compressed stream through at least one discharge valve downstream of the compressor recycle line to provide a controlled stream; and
(b) providing a compressor bypass line around the discharge valve and the compressor, from the compressor feed stream to the controlled stream, said compressor bypass line having a bypass valve; and
(c) controlling the discharge valve in response to the difference between the choke controlled variable (CO2) and the anti-choke set point (SP2).

15. The method according to claim 14, wherein in step the discharge valve and/or the suction valve is automatically controlled in response to the difference between the choke controlled variable (CO2) calculated in step (c) and the anti-choke set point (SP2) provided in step (d) for anti-choke control.

16. The method according to claim 14, wherein the controlled stream is passed to a unit selected from the group comprising: a hydrotreater, a hydroprocessor and a further compressor.

17. An apparatus for controlling a compressor (50), the apparatus (1) comprising:
a compressor to compress a compressor feed stream between an inlet and an outlet to provide a compressed stream, the compressor (50) driven by a driver;
one or more measurers (V, $V_{sd}$, N) able to measure one or more of the following parameters: (i) the stream velocity (v) of the compressor feed stream and the sonic velocity ($v_{sd}$) of the compressor feed stream and (ii) the volumetric flow (Q) of the compressor feed stream through the compressor and the speed of the compressor (N);
a compressor recycle line around the compressor from the compressed stream to the compressor feed stream, said compressor recycle line comprising an in-line recycle valve;
a controller (XC) associated with the one or more measurers for regulating at least one of the in-line recycle valve and the speed of the compressor, wherein the controller (XC):
calculates one or more controlled variables (CO1, CO2) that are invariant to compressor inlet conditions of the compressor feed stream, said inlet conditions comprising at least the ratio of specific heats (Cp/Cv) of the compressor feed stream, said one or more controlled variables (CO1, CO2) comprising a surge controlled variable (CO) and determined from the sets of parameters measured by the one or more measurers;
stores one or more set points (SP1, SP2) comprising an anti-surge set point (SP1) corresponding to a surge control line which is invariant to the compressor inlet conditions of the compressor feed stream, said inlet conditions comprising at least the ratio of specific heats (Cp/Cv) of the compressor feed stream; and
determines the difference between the surge controlled variable (CO1) and the anti-surge set point (SP1) to provide a signal to the in-line recycle valve or driver when the surge controlled variable (CO1) moves away from the anti-surge set point (SP1) in the direction of surge.

18. The apparatus according to claim 17 further comprising:
two or more further measurers able to measure a first pressure ($P_1$) of the compressor feed stream and the second pressure ($P_2$) of the compressed stream and transmit said measurements to the controller (XC) for inclusion in the calculation of the one or more controlled variables (CO1, CO2); and
wherein the set points (SP1, SP2) are constant values.

19. The apparatus according to claim 17 further comprising: two or more further measurers able to measure:
(1) the compressor speed (N) of the compressor and the sonic velocity ($v_{sd}$) of the compressor feed stream and
(2) the outlet pressure ($P_2$) of the compressed stream and the inlet pressure ($P_1$) of the compressor feed stream; and
transmit said measurements to a controller (XC) to calculate the one or more set points (SP1, SP2).

* * * * *